United States Patent Office 2,902,406
Patented Sept. 1, 1959

2,902,406

METHOD FOR PREPARING IODINATED THYROID

John Eibert, Jr., Sappington, Mo., assignor to Stanford Laboratories, Inc., St. Louis, Mo., a corporation of Missouri No Drawing. Application March 3, 1958
Serial No. 718,395

5 Claims. (Cl. 167—76)

This invention relates to thyroid and, more particularly, to a dry, powdered thyroid of high uniform physiologic activity for providing a uniform clinical response, and to a process for preparing same.

Heretofore, dry, powdered thyroid, prepared from the thyroid glands of domesticated animals, such as pigs, cattle, and the like, has not been of relatively uniform physiologic activity, but has varied within a rather astonishingly wide range, such as from 40% to as high as 107% of a standard pork thyroglobulin preparation. The administration to patients of thyroid tablets varying so pronouncedly in biologic potency cannot be consistently productive of the expected modifications of the condition being treated. Thus, because of such variations, serious, highly undesirable results in patient treatment may be caused, and such have been most common, necessitating costly and frequent metabolism tests so as ascertain whether the prescribed therapy has been effective.

It has been recognized that there are numerous reasons which might account for this disparity in physiologic activity in thyroid preparations. One such reason relates to the source of the thyroid glands from which the thyroid is being prepared, as it has been discovered that on an equal total iodine basis pork thyroid is approximately twice as active as beef thyroid and that biological assays have shown conclusively that wide variations may be found between the physiological activities of pork and beef thyroid preparations[1]. Additionally, and of great moment, is the fact that the standard of thyroid set by the United States Pharmacoepia has, unfortunately, been so low with respect to iodine content that compliance therewith does not necessarily assure that the preparation will have the activity appropriate for attaining the desired patient reaction.

Therefore, it is an object of the present invention to provide dry, powdered thyroid which will be of consistent, uniformly high physiologic activity so that the particular prescribed dosage thereof will provide a uniform clinical response.

It is another object of the present invention to provide a method for preparing dry, powdered thyroid wherein the iodine content will exceed that of the thyroid glands in vivo from which the thyroid is prepared.

It is a further object of the present invention to provide a method for the preparation of dry, powdered thyroid which is economic; which may be readily practiced by current processors; and which will produce a preparation of uniform biologic potency.

With the above and other objects in view, my invention resides in the novel compositions of matter and novel methods and processes presently described and pointed out in the claims.

Essentially, the method of the present invention involves subjecting animal thyroid glands to a solution of a deiodinase-inhibitor to prevent the customary degradation of a portion of the thyroglobulin through the normal deiodinating activity of this enzyme, and the addition of free iodine to a homogenate formed from the glands whereby the resulting preparation will have a total organic iodine content consistently and markedly in excess of the iodine content of thyroid preparations made in accordance with currently practiced methods.

It has been osberved that the calorigenic value (or physiologic activity) of whole dry thyroid is dependent on the total organic iodine present, rather than the amount of thyroxin content[2]. In view of this, the substantial variations of such value in presently prepared thyroid preparations will be understood; as the same may eventuate from several primary causes, such as the source of the thyroid gland being processed, as the glands of some animals are more active than others, and that the glands of certain animals vary from season to season in physiologic activity. Also, the enzyme activity may be greater in some glands than others with resultant relatively increased undesired deiodination.

Extensive research has established that the presence in thyroid tissue of the enzyme deiodinase, which as its name implies, deiodinates mono- and diodo-tyrosine, both of said compounds forming integral components of the thyroglobulin molecule and as such bear immediately upon the physiological activity thereof. Consequently, unless the action of this enzyme is inhibited during preparation of thyroid the total organic iodine content thereof will patently be less than that of the glands in vivo, wherefore, if such glands were of a relatively low order of physiologic activity, the thyroid preparation therefrom would, perforce, be of dubious clinical value.

The proposed model of the metabolic process of thyroid glands involves the oxidation of the iodide ion to iodine[3], which latter is then chemically incorporated into the protein molecule known generally as thyroglobulin. It will be observed that concurrently within functioning normal thyroid tissue there would be an acretion of the iodine content by such metabolism wherein free iodine forms iodo-proteins and the degrading of a portion of the protein by the action of deiodinase so that from the standpoint of physiologic activity the tissue would be subjected to an iodine increase and an iodine diminution, providing an uncertain resultant balance.

The method of the present invention inhibits the enzymatic deiodination process and increases the total organic iodine content, and comprises the following procedural sequence: A predetermined quantity by weight of animal thyroid glands, such as of beef, pork, or the like, are promptly upon extraction chilled in ice or in ice-salt mixtures in accordance with present practice. The chilled glands, are, as soon as convenient, then placed in a solution of a diodenase-inhibitor and while in such solution macerated, as by the use of a conventional motor-driven grinder, until a thick, fluid, homogeneous mass is presented. The total weight of the solution of the enzyme inhibitor is between one and two times the weight of the thyroid glands being treated and the molar strength thereof may be between $5 \times 10^{-2}$ to $5 \times 10^{-5}$, although the desired strength is in the middle of such range, such as $5 \times 10^{-3}$ or $5 \times 10^{-4}$. To develop the said solution there is dissolved in the requisite quantity of distilled water the consonant amount of any well known water soluble deiodinase-inhibitor, such as the inorganic sulfides, as sodium sulfide, ammonium sulfide, potassium sulfide, etc., or the water soluble salts of inorganic cyanides, or of iodoacetic acid. The

[1] Stasilli and Kroc, Journal of Clinical Endocrinology and Metabolism 16: 1595; (1956), Jackson, Journal American Medical Association 165: 151 (1957).

[2] Lerman and Salter, Journal Pharm. & Exp. Ther. 50: 298 (1954).
[3] Chaikoff and Taurog, N.Y. Academy of Science, 50: 377 (1949).

subjection of the thyroid glands to this solution is undertaken at room temperature, as is the maceration, and as stated above, the grinding of the glands in the solution will produce a thick homogenate.

Thereon connective tissues are removed from the homogenate, as by the use of a coarse screen, or by any other well known means, and thereafter there is added to the homogenate an aqueous solution of free iodine. It may be pointed out that the addition of this iodine solution might, if desired, be made prior to the removal of the connective tissue. Said iodine solution contains an amount of iodine which may be as much as three times the amount of iodine present in the thyroid glands in vivo. It is understood that through experience a processor can readily calculate the average amount of iodine present in the thyroid glands being treated so that the iodine solution will have the requisite strength. Normally, the average amount of iodine present in thyroid glands is proportionate to the total weight of the glands, with the source thereof expectedly being taken into consideration. The iodine solution is then stirred into the homogenate at room temperature until fully chemically bound therein. This step may take from one to four hours depending upon the atmospheric conditions. The extent of the reception of the iodine within the homogenate is periodically determined as by the standard starch iodine blue test, so that the integration of all free iodine into the thyroglobulin will be promptly indicated. The homogenate is then dried at low temperature, not exceeding 45° C., by any of the common drying methods now known, such as, by the addition of cold anhydrous acetone, drying in a vacuum, etc., and after drying the product is then pulverized to produce the therapeutic dry powdered thyroid, which may be tabletized into dosage units.

From the foregoing, it will be seen that the present method contemplates the inhibition of iodine-destructive action by diodenase and the incorporation of additional iodine within the thyroid homogenate so that the preparation will contain a greater amount of total organic iodine than that present in the living thyroid glands.

It should be understood that changes in the methods, composition, percentages, and combinations set forth may be made without departing from the nature and principle of my invention.

I claim:

1. The method for preparing dry thyroid which comprises providing animal thyroid glands, subjecting said thyroid glands to a solution of an agent inhibiting the action of the enzyme deiodinase of the class consisting of water soluble salts of inorganic sulfides, inorganic cyanides, and iodoacetic acid, macerating said glands while in said solution to provide a homogenate, adding free iodine to said homogenate, and then drying the iodized homogenate.

2. The method for preparing dry thyroid which comprises providing animal thyroid glands, placing said glands in a solution of an agent inhibiting the action of the enzyme deiodinase of the class consisting of water soluble salts of inorganic sulfides, inorganic cyanides, and iodoacetic acid, macerating said glands while in said solution to produce a thick fluid homogeneous mass, then adding to said homogenate an aqueous solution of free iodine wherein the amount of iodine in the solution will at least be equivalent to the total amount of iodine in the glands in vivo, agitating said homogenate and iodine solution until all the iodine is chemically bound within the homogenate, and then drying said iodized homogenate.

3. The method of preparing dry thyroid which comprises providing animal thyroid glands, chilling said glands, placing said glands within a solution of an agent inhibiting the action of the enzyme deiodinase, of the class consisting of water soluble salts of inorganic sulfides, inorganic cyanides, and iodoacetic acid, macerating said glands in said solution at room temperature until a thick fluid homogeneous mass results, stirring into the homogenate an aqueous solution of free iodine wherein the iodine content is between one and three times the amount of iodine present in the glands in vivo, and then drying the iodized homogenate.

4. The method of preparing dry thyroid which comprises providing animal thyroid glands, chilling said glands then placing said glands in an aqueous solution of an agent inhibiting the action of the enzyme deiodinase wherein the solution shall have a molar strength of between $5 \times 10^{-2}$ to $5 \times 10^{-5}$ and wherein the inhibitor shall be from the class consisting of the water soluble salts of inorganic sulfides, inorganic cyanides, and iodoacetic acid, then macerating the said glands while in said solution to produce a thick fluid homogeneous mass, then removing the connective tissue from the homogenate, then adding to the homogenate an aqueous solution of free iodine and mixing said iodine solution and glands until the free iodine is fully chemically bound within the homogenate, and then drying said homogenate.

5. The method for preparing dry powdered thyroid which comprises providing animal thyroid glands, chilling said glands, placing said glands in an aqueous solution of an agent inhibiting the action of the enzyme deiodinase, said solution having a molar strength of between $5 \times 10^{-2}$ to $5 \times 10^{-5}$ and said inhibitor being from the class consisting of the water soluble salts of inorganic sulfides, inorganic cyanides, and iodoacetic acid, said solution having a total weight of between one and two times the weight of the thyroid glands being treated, then macerating said glands in said deiodinase-inhibitor solution until there is produced a thick fluid homogeneous mass, removing the connective tissue from said homogenate, then adding to said homogenate an aqueous solution of free iodine wherein the amount of iodine may be up to three times the amount of iodine present in the thyroid glands in vivo, stirring said homogenate and iodine solution until the iodine therein is fully chemically bound within the homogenate, then drying the homogenate, and then pulverizing same.

No references cited.